(12) United States Patent
Moon et al.

(10) Patent No.: US 9,422,642 B2
(45) Date of Patent: Aug. 23, 2016

(54) WEAR POLYTETRAFLUOROETHYLENE (PTFE) FIBER AND METHOD OF MAKING SAME

(71) Applicant: Toray Fluorofibers (America), Inc., Decatur, AL (US)

(72) Inventors: Chester Darryl Moon, Tuscumbia, AL (US); Arthur Russell Nelson, Decatur, AL (US); Trevor Guldstrand, Madison, AL (US); Matt Hutto, Courtland, AL (US)

(73) Assignee: Toray Fluorofibers (America), Inc., Decatur, AL (US)

(\*) Notice: Subject to any disclaimer, the term of this patent is extended or adjusted under 35 U.S.C. 154(b) by 273 days.

(21) Appl. No.: 13/953,401

(22) Filed: Jul. 29, 2013

(65) Prior Publication Data
US 2015/0031801 A1 Jan. 29, 2015

(51) Int. Cl.
*D01F 6/12* (2006.01)
*D01D 5/00* (2006.01)
*D01F 1/10* (2006.01)

(52) U.S. Cl.
CPC *D01F 6/12* (2013.01); *D01D 5/00* (2013.01); *D01F 1/10* (2013.01)

(58) Field of Classification Search
USPC .............................................. 524/430; 264/13
See application file for complete search history.

(56) References Cited

U.S. PATENT DOCUMENTS

| | | | | |
|---|---|---|---|---|
| 2,772,444 A * | 12/1956 | Burrows | ................... | D01F 6/12 106/166.6 |
| 3,114,672 A * | 12/1963 | Schott | ................. | D21H 5/1227 162/146 |
| 3,655,853 A * | 4/1972 | Gallup | ..................... | D01F 6/48 264/127 |
| 5,723,081 A * | 3/1998 | Blankenbeckler | ........ | D01F 6/12 264/127 |
| 5,762,846 A * | 6/1998 | Blankenbeckler | ........ | D01F 6/12 264/127 |
| 2005/0025967 A1* | 2/2005 | Lawton | ................... | C03C 25/00 428/375 |
| 2005/0048294 A1* | 3/2005 | Kaplan | .............. | G03G 15/2057 428/447 |
| 2008/0063965 A1* | 3/2008 | Lai | ....................... | G03G 9/0804 430/108.1 |

\* cited by examiner

*Primary Examiner* — Peter D Mulcahy
*Assistant Examiner* — Henry Hu
(74) *Attorney, Agent, or Firm* — C. Brandon Browning; Maynard, Cooper & Gale, PC

(57) ABSTRACT

A dispersion spun fluoropolymer fiber prepared from non-melt-processible polytetrafluoroethylene particles and aluminum oxide particles. The concentration of $Al_2O_3$ in the aqueous dispersion may range from between about 0.1% to about 5%, with specific concentration of 0.1%, 1.0. The aqueous dispersion is mixed with an aqueous matrix polymer solution containing a matrix polymer and then extruded into a coagulation bath containing a concentration of ions which coagulate the matrix polymer to form an intermediate fiber structure which carries ionic species. The intermediate fiber structure is sintered to decompose the matrix polymer and coalesce the polytetrafluoroethylene particles and the $Al_2O_3$ particles into a blended fiber. The resulting, blended fluoropolymer fiber exhibits improved properties relative to 100% dispersion spun polytetrafluoroethylene fibers.

3 Claims, 4 Drawing Sheets

WEAR POLYTETRAFLUOROETHYLENE (PTFE) FIBER AND METHOD OF MAKING SAME

FIELD OF THE INVENTION

The present invention is directed to a dispersion spun fluoropolymer fiber, and more particularly, to a dispersion spun fluoropolymer fiber prepared from non-melt processible, high molecular weight, polytetrafluoroethylene particles and aluminum oxide particles.

BACKGROUND OF THE INVENTION

Fluoropolymers have properties such as extremely low coefficient of friction, wear and chemical resistance, dielectric strength, temperature resistance and various combinations of these properties that make fluoropolymers useful in numerous and diverse industries. For example, in the chemical process industry, fluoropolymers are used for lining vessels and piping. The biomedical industry has found fluoropolymers to be biocompatible and so have used them in the human body in the form of both implantable parts and devices with which to perform diagnostic and therapeutic procedures. In other applications, fluoropolymers have replaced asbestos and other high temperature materials. Wire jacketing is one such example. Automotive and aircraft bearings, seals, push-pull cables, belts and fuel lines, among other components, are now commonly made with a virgin or filled fluoropolymer component.

Dispersion spun or wet polytetrafluoroethylene (PTFE) yarns are typically produced by forming a spin mix containing an aqueous dispersion of poly(tetrafluoroethylene) particles and a solution of a cellulosic ether matrix polymer. The spin mix is then extruded at relatively low pressure (e.g., less than 150 pounds per square inch) through an orifice into a coagulation solution usually containing sulfuric acid to coagulate the matrix polymer and form an intermediate fiber structure. The intermediate fiber structure, once washed free of acid and salts, is passed over a series of heated rolls to dry the fiber structure and sinter the PTFE particles into a continuous PTFE filament yarn. Sintering the intermediate PTFE fiber structure causes the PTFE particles in the structure to coalesce and entangle thus forming a continuous PTFE filament fiber.

SUMMARY OF THE INVENTION

The present invention is directed to a dispersion spun fluoropolymer fiber including a blend of non-melt processible, high molecular weight, polytetrafluoroethylene particles and aluminum oxide ($Al_2O_3$) particles. The fluoropolymer fiber is prepared by forming an aqueous dispersion of $Al_2O_3$ particles and non-melt-processible polytetrafluoroethylene particles, the polytetrafluoroethylene particles having a standard specific gravity (SSG) of less than about 2.4. The concentration of $Al_2O_3$ in the aqueous dispersion may range from between about 0.1% to about 5%, with specific concentration of 0.1% to about 1.0%. The aqueous dispersion of polytetrafluoroethylene particles and $Al_2O_3$ particles is mixed with an aqueous matrix polymer solution containing a matrix polymer selected from the group consisting of methylcellulose, hydroxyethylcellulose, methylhydroxypropylcellulose, hydroxypropylmethylcellulose, hydroxypropylcellulose, ethylcellulose and carboxymethylcellulose. The mixture is then extruded into a coagulation bath containing a concentration of ions which coagulate the matrix polymer to form an intermediate fiber structure which carries ionic species. Thereafter, the intermediate fiber structure is sintered to decompose the matrix polymer and coalesce the polytetrafluoroethylene particles and the $Al_2O_3$ particles into a blended fiber. The resulting, blended fluoropolymer fiber, which exhibits improved properties relative to 100% dispersion spun polytetrafluoroethylene fibers, is suitable for use in bearings, bushings, fabrics, belts, diaphragms, coatings, filters and seals.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION OF THE INVENTION

Figure 1A:
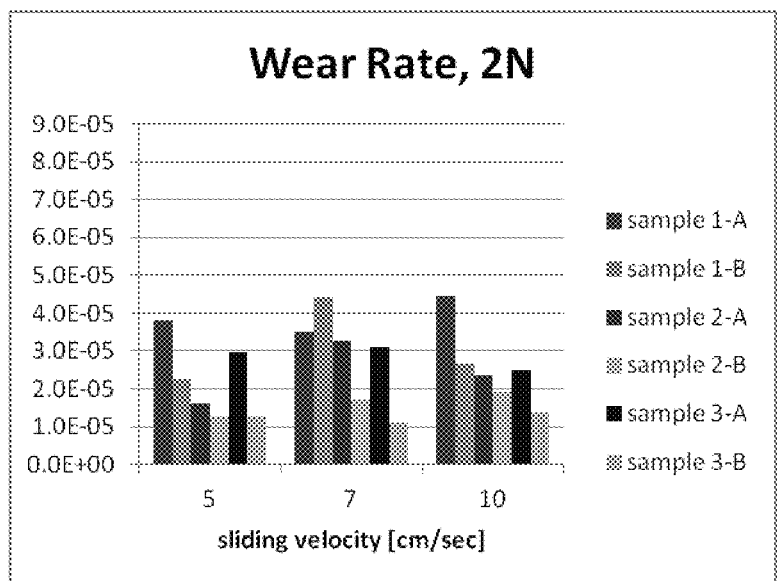
FIG. 1A is a graphical illustration of the calculated wear rates of three vinyl ester film samples with varying concentrations of $Al_2O_3$ and a pin load of 2N.

The present invention is directed to a dispersion spun fluoropolymer fiber including a blend of polytetrafluoroethylene particles and $Al_2O_3$ particles. By "dispersion spun" it is meant that the fiber is prepared by forming an aqueous dispersion of insoluble fluoropolymer particles, such as PTFE, $Al_2O_3$ particles and polymers generally known as fluorinated olefinic polymers, mixing the dispersion with an aqueous matrix polymer solution containing a matrix polymer, extruding the mixture into a coagulation bath and forming an intermediate fiber structure. The intermediate fiber structure is then sintered to decompose the matrix polymer and coalesce the polytetrafluoroethylene particles and the $Al_2O_3$ particles into a blended fiber.

The matrix spinning process of PTFE allows for the inclusion of an appreciable concentration of $Al_2O_3$ into a fiber structure that has sufficient tensile properties for normal textile processing such as knitting and weaving. The inclusion of $Al_2O_3$ into a matrix spun PTFE fiber results in a true bicomponent fluoropolymer fiber with typical thermal capabilities (maximum continuous use temperature) of PTFE. Further, the inclusion of $Al_2O_3$ into the fiber matrix provides enhanced wear characteristics in the resulting textile product. Specifically, the presently described matrix imparts improved thermal conducting properties and improved cut resistance to fabrics produced from the filament yarns. The resulting fabrics may be utilized in the production of protective clothing, such as clothing and textiles used in high temperature applications, for example laminated cooking belts.

Polytetrafluoroethylene

The polytetrafluoroethylene particles used in the dispersion employed in this invention are non-melt-processible particles of polytetrafluoroethylene (PTFE) including modified PTFE which is not melt-processible. Polytetrafluoroethylene (PTFE) refers to the polymerized tetrafluoroethylene by itself without any significant comonomer present. Modified PTFE refers to copolymers of PTFE with such small concentrations of comonomer that the melting point of the resultant polymer is not substantially reduced below that of PTFE. The concentration of such comonomer is preferably less than 1 wt %, more preferably less than 0.5 wt %. The modified PTFE contains a small amount of comonomer modifier which improves film forming capability during baking (fusing), such as perfluoroolefin, notably hexafluoropropylene (HFP) or perfluoro(alkyl vinyl)ether (PAVE), where the alkyl group contains 1 to 5 carbon atoms, with perfluoro(ethyl vinyl)ether (PEVE) and perfluoro(propyl vinyl)ether (PPVE) being preferred. Chlorotrifluoroethylene (CTFE), perfluorobutyl ethylene (PFBE), or other monomer that introduces bulky side groups into the molecule are also included. The PTFE typically has a melt creep viscosity of at least $1 \times 10^9$ Pa·s. The resins in the dispersion used in this invention when isolated and dried are non-melt-processible. Such high melt viscosity indicates that the PTFE does not flow in the molten state and therefore is non-melt-processible By non-melt-processible, it is meant that no melt flow is detected when tested by the standard melt viscosity determining procedure for melt-processible polymers. This test is according to ASTM D-1238-00 modified as follows: The cylinder, orifice and piston tip are made of corrosion resistant alloy, Haynes Stellite 19, made by Haynes Stellite Co. The 5.0 g sample is charged to the 9.53 mm (0.375 inch) inside diameter cylinder which is maintained at 372° C. Five minutes after the sample is charged to the cylinder, it is extruded through a 2.10 mm (0.0825 inch diameter), 8.00 mm (0.315 inch) long square-edge orifice under a load (piston plus weight) of 5000 grams. This corresponds to a shear stress of 44.8 KPa (6.5 pounds per square inch). No melt extrudate is observed.

The polytetrafluoroethylene particles have a standard specific gravity (SSG) of less than 2.40, typically from about 2.14 to about 2.40, preferably less than about 2.30, and more preferably less than about 2.25. The SSG is generally inversely proportional to the molecular weight of PTFE or modified PTFE.

The fluoropolymer particles in the dispersion used in this invention preferably have a number average particle size of about 100 nm to about 400 nm, most preferably, about 120 nm to about 220 nm.

Aluminum Oxide

Aluminum oxide is the most commonly occurring of several aluminum oxides, and specifically identified as aluminum(III) oxide. $Al_2O_3$ is often used to produce aluminum metal, as an abrasive owing to its hardness, and as a refractory material owing to its high melting point. $Al_2O_3$ is an electrical insulator but has a relatively high thermal conductivity (30 $Wm^{-1}K^{-1}$) for a ceramic material. Aluminum oxide is completely insoluble in water and its hardness makes it suitable for use as an abrasive and as a component in cutting tools. Aluminum oxide is responsible for the resistance of metallic aluminum to weathering. A thin passivation layer of aluminum oxide (approximately 4 nm) forms on the surface of any exposed aluminum layer after contact with oxygen. This layer protects the metal from further oxidation and enhances corrosion resistance and enhancing hardness.

The $Al_2O_3$ particles in the dispersion preferably have a number average particle size of about 10 microns or less, most preferably, 5 microns or less.

Spinning Composition and Matrix Polymers

The present invention provides a spinning composition useful for the dispersion spinning of non-melt-processible fluoropolymer fiber comprising a mixture of an aqueous solution of a matrix polymer and an aqueous dispersion of $Al_2O_3$ particles and non-melt-processible polytetrafluoroethylene particles having an SSG of less than about 2.40, typically from about 2.14 to about 2.40. In preferred embodiments the non-melt-processible polytetrafluoroethylene particles have an SSG of less than 2.30, and more preferably less than about 2.25.

Matrix polymers used in the practice of the present invention may be polymers containing only hydrogen, carbon, oxygen and nitrogen that are soluble in aqueous solutions that may be coagulated or precipitated by a salt or a shift of pH. One method which is commonly used to spin PTFE and related polymers includes spinning the polymer from a mixture of an aqueous dispersion of the polymer particles and viscose, where cellulose xanthate is the soluble form of the matrix polymer, as taught for example in U.S. Pat. Nos. 3,655,853; 3,114,672 and 2,772,444. The aqueous dispersion of $Al_2O_3$ particles and polytetrafluoroethylene particles is prepared by pouring the PTFE dispersion into a tote and adding the $Al_2O_3$ dispersion to the PTFE dispersion. The dispersion is mixed mechanically in the tote for about an hour with slow agitation to avoid shear. The mixed dispersion is then loaded into a supply tank and put under vacuum. In one embodiment, the aqueous dispersion includes, by weight, 95% PTFE and 5% $Al_2O_3$.

However, the use of viscose in fiber forming suffers from serious disadvantages related to cost of manufacture, production time and environmental hazards. Alternatives to viscose forming have been developed and most recently a process using cellulosic ethers with a uniform degree of substitution of the matrix has been fully described in U.S. Pat. Nos. 5,762,846 and 5,820,984. Preferably, the fluoropolymer fiber of the present invention is prepared using a more environmentally friendly method than those methods utilizing viscose. One such method is described in U.S. Pat. Nos. 5,820,984; 5,762,846, and 5,723,081, which patents are incorporated herein in their entireties by reference. In general, this method employs a cellulosic ether polymer such as methylcellulose, hydroxyethylcellulose, methylhydroxypropylcellulose, hydroxypropylmethylcellulose, hydroxypropylcellulose, ethylcellulose or carboxymethylcellulose as the soluble matrix polymer, in place of viscose.

Cellulosic ether polymers are preferred since these polymers do not melt or soften below the temperature range in which most fluorinated olefinic polymers melt and the polymer decomposes into carbonaceous material on sintering. For example, such cellulosic polymers are methylcellulose, hydroxyethylcellulose, methylhydroxypropylcellulose, hydroxypropylmethylcellulose, hydroxypropylcellulose, ethylcellulose and carboxymethylcellulose. The cellulosic ethers preferred for use in this invention as a matrix polymer have a uniform degree of substitution, and are soluble in strong aqueous alkali hydroxide, but insoluble in near neutral pH water. By the term near neutral pH water is meant water having a pH from about 6 to 8. In addition, the matrix polymers used in the practice of the present invention have no softening or melting point. These polymers decompose at temperatures near the sintering temperature of the fiber providing requisite tensile strength until the fluoropolymer particles have coalesced such that the resultant fluoropolymer structure provides the necessary tensile strength.

In order to achieve useful coalesced fluoropolymer fibers, it is desirable to wash the intermediate fiber structure free of ions absorbed from the coagulation bath as well as to remove other impurities such as additives and/or dispersants that are present in the initial fluoropolymer dispersion and to remove materials that are detrimental to fiber sintering and/or the properties of the final, coalesced fluorinated polymer fiber.

As used herein, intermediate fiber structure means the extruded and coagulated mixture of the matrix polymer solution and the polymer particle dispersion. The intermediate fiber structure produced in the practice of the present invention, after washing in near neutral pH water to substantially remove ions and impurities, shows no substantial loss of strength or integrity, and may be worked, for example drawn at a modest draw ratio, and sintered to form a final, coalesced fluorinated polymer fiber or shaped article. The intermediate fiber structure produced by the present invention may be isolated, worked in subsequent processing or used for producing fabrics or batts as is known in this art.

In the practice of the present invention, the composition of the intermediate fiber structure has a cellulosic ether matrix polymer present as a minor constituent of the fiber solids, while the major constituents are $Al_2O_3$ and non-melt processible fluoropolymer particles having a weight in the intermediate fiber structure that may be from 3 to 20 times that of the matrix polymer.

EXAMPLES

The present invention will be explained further in detail by the following Examples. In each of the Examples, the intermediate, cellulosic ether-based PTFE fiber structures were prepared in accordance with the method described in U.S. Pat. Nos. 5,820,984; 5,762,846, and 5,723,081 and subsequently processed. Utilizing the method described herein, fluoropolymer fibers including, by weight, 99.9% PTFE-0.1% $Al_2O_3$ and 99.0% PTFE-1.0% $Al_2O_3$ were prepared and evaluated as further described in Tables 1 through 6. Although not specifically described herein, it will be appreciated by one of skill in the art that other concentrations of $Al_2O_3$ may be used in the preparation of the PTFE fiber structure. In addition, other components, such as a polymer modifier, may be added to the spin mix in very low concentrations to improve the flow ability of the melted PTFE around the $Al_2O_3$ particles. The use of a polymer modifier could increase tenacity if the tenacity of the resulting fiber is not sufficient. The spin mix was prepared from an aqueous dispersion of fluoropolymer particles containing PTFE dispersion obtained from by E. I. duPont de Nemours & Co. The matrix polymer utilized in the spin mix was CS Polymer (Hydroxypropyl Cellulose) obtained from Shin Etsu Chemical Industry Co. (Tokyo, Japan).

The fiber structures were processed in accordance with the present invention and three yarns with varying denier (approximately 370, 2500 and 2570) were prepared and evaluated.

Experiment 1

400 Denier-1.0% $Al_2O_3$

TABLE 1

Properties of Standard Fiber

| Name | Denier/dpf | Den. Spec | Tenacity (gf/den) | E.B. (%) | L-Color | Avg. Force (gF) | Peak Force (gF) | Shrinkage (%) |
|---|---|---|---|---|---|---|---|---|
| 400 Reg. | 400/6.7 | 340-460 | 2.00 (1.60-2.40) | 15.0 (8.0-22.0) | 15.5 (12.5-18.5) | 43.1 (23.9-55.0) | 54.6 (42.4-72.8) | 25.1 (22.6-31.7) |

TABLE 2

Experimental 400 Denier-1.0% $Al_2O_3$

| BOBBIN # | DENIER | TENACITY (g/den) | E.B. (%) | L-Color |
|---|---|---|---|---|
| 1 | 404 | 1.69 | 11.31 | 16.91 |
|   |   | 1.47 | 10.53 | 16.94 |
| 2 | 344 | 1.65 | 11.15 | 17.17 |
|   |   | 1.66 | 10.65 | 17.06 |
| Sampled Average | | | | |
|   | 374 | 1.62 | 10.91 | 17.02 |

Experiment 2

2400 Denier-1.0% $Al_2O_3$

TABLE 3

Properties of Standard Fiber

| Name | Denier/dpf | Den. Spec | Tenacity (gf/den) | E.B. (%) | L-Color | Avg. Force (gF) | Peak Force (gF) | Shrinkage (%) |
|---|---|---|---|---|---|---|---|---|
| 2400 Reg. | 2400/6.7 | 2100-2700 | 1.50 (1.30-1.76) | 30.0 (19.0-41.0) | 17.6 (15.1-20.1) | 161.3 (88.3-207.8.0) | 186.4 (145.9-262.5) | 21.7 (17.7-27.7) |

TABLE 4

Experimental 2400 Denier-1.0% Al$_2$O$_3$

| BOBBIN # | DENIER | TENACITY (g/den) | E.B. (%) | L-Color |
|---|---|---|---|---|
| 1 | 2440 | 1.43 | 22.37 | |
| | | 1.40 | 21.90 | 19.18 |
| 2 | 2700 | 1.41 | 23.27 | 19.31 |
| | | 1.35 | 21.61 | 19.28 |
| Sampled Average | | | | |
| | 2570 | 1.40 | 22.29 | 19.26 |

Experiment 3

2400 Denier-0.1% Al$_2$O$_3$

TABLE 5

Properties of Standard Fiber

| Name | Denier/dpf | Den. Spec. | Tenacity (gf/den) | E.B. (%) | L-Color | Avg. Force (gF) | Peak Force (gF) | Shrinkage (%) |
|---|---|---|---|---|---|---|---|---|
| 2400 Reg. | 2400/6.7 | 2100-2700 | 1.50 (1.30-1.76) | 30.0 (19.0-41.0) | 17.6 (15.1-20.1) | 161.3 (88.3-207.8.0) | 186.4 (145.9-262.5) | 21.7 (17.7-27.7) |

TABLE 6

Experimental 400 Denier-0.1% Al$_2$O$_3$

| BOBBIN # | Denier | Tenacity (g/den) | E.B. (%) | L-Color |
|---|---|---|---|---|
| 0 | — | | | |
| 1 | 2210 | | | |
| 2 | 2202 | | | |
| 3 | 2510 | | | |
| 4 | 2444 | 1.62 | 20.25 | 16.84 |
| | | 1.57 | 19.09 | 17.51 |
| 5 | 2430 | 1.54 | 19.42 | 16.90 |
| | | 1.41 | 18.76 | 16.94 |
| 6 | 2484 | | | |
| 7 | 2424 | | | |
| 8 | 2390 | | | |
| 9 | 2520 | 1.66 | 20.55 | 18.16 |
| | | 1.64 | 20.13 | 17.39 |
| 10 | 2630 | 1.51 | 19.49 | 17.90 |
| | | 1.40 | 16.93 | 17.45 |
| 11 | 2442 | 1.49 | 18.39 | 17.57 |
| | | 1.37 | 18.09 | 17.47 |
| 12 | 2392 | | | |
| 13 | 2596 | | | |
| 14 | 2560 | | | |
| 15 | 2530 | 1.53 | 18.72 | 17.41 |
| | | 1.42 | 18.00 | 17.33 |
| 16 | 2560 | | | |
| Sampled Average | | | | |
| | 2499 | 1.51 | 18.99 | 17.41 |

[1]Three bobbins made that were too small
[2]Air in line

Examination of the prepare yarns in Experiments 1, 2 and 3 included testing of the tensile strength, elongation before break (E.B. %) and L-color. These values represent fundamental properties that are used to establish limitations on fiber-processing and upon their end-use applications. Tensile strength is the measure of strength of a fiber or yarn. This is usually defined as the ultimate (breaking) force of the fiber (in gram-force units) divided by the denier. To measure the tensile strength of a polymer sample, the sample is stretched by a machine such as an Instron. This machine clamps each end of the sample and elongates the sample. During stretching, the device measures the amount of force (F) that is exerted on the fiber. The amount of force exerted on the fiber is increased until it breaks. The stress needed to break the sample is the tensile strength of the material. The numerical expression of the force is then divided by the cross-sectional area (in this case Denier) and resulting tenacity is expressed as grams per Denier (g/denier). The elongation-to-break is a measure of the change in fiber length before breaking. When stress is applied to a fiber, the sample deforms by stretching, becoming longer. Percent elongation refers to the length the of the sample after stretching as compared to the original length of the sample This usually is expressed as a percent. L-Color is calculated on a range from 0 to 100 where O is black and 100 is white. Thus, lower the L-Color the darker the color.

The tensile strength, E.B. % and L-color were determined for the yarns incorporating Al$_2$O$_3$ and these values compared to values obtained for standard yarns with the same denier (i.e., yarns containing no Al$_2$O$_3$). Tables 1, 3 and 5 illustrate the properties of standard 100% PTFE fibers. Tables 2, 4 and 6 illustrate the properties of the PTFE/Al$_2$O$_3$ fibers of the present invention.

The minimum tested average tenacity is at least 1.40 gf/den, while the average elongation to break was at least 10.91%. The mix was found to be stable at a maximum usable temperature of about 260° C., with intermittent excursions of about 288° C. not exceeding 30 minutes.

Experiment 4

Friction Coefficient Determination and Wear Rate Analysis of PTFE Loaded Vinyl Ester Films Three differently loaded PTFE vinyl ester films (0%, 0.1% and 1.0% Al$_2$O$_3$ concentration) were prepared in accordance with the present invention and the wear rate and friction coefficient measured for each sample. Although not specifically described herein, it will be appreciated by one of skill in the art that other concentrations of Al$_2$O$_3$ may be used in the preparation of the PTFE film. In addition, other components may be added to the vinyl ester mix in very low concentrations to aid in the preparation of the films.

The films were evaluated through application of pin-on-disk (POD) testing at three load levels (2N, 5N and 10N) as further described in Tables 7 through 10. The POD tester is one of the best known and most widely used tribotesters. The apparatus consists of a stationary pin that, under the influence of a dead-weight, rests on a rotating disk (i.e., sample). The user has the ability to control and measure the applied normal load onto the sample, unidirectional speed or oscillation frequency of the spinning disk, as well as environmental parameters such as temperature, pressure, type of gas (vacuum, air, nitrogen, refrigerant, etc.) and presence of a lubricant. Transducers measure both the normal and friction forces applied to the sample. The pin holder is attached to a fixture that is allowed to deflect slightly; the transducer measures this deflection and converts it to a force. Performance is generally characterized by friction coefficient and wear rates (wear per unit time) determined my mass or volume loss. The wear tracks produced by the POD were then analyzed through scanning electron microscopy (SEM) and the wear rate for each sample calculated.

The testing parameters were as follows:

1. The friction coefficient of each of the vinyl ester film samples was determined through POD testing.
2. The width of each wear track imparted on the vinyl ester film samples through POD testing was measured using SEM.
3. Light microscopy was used to measure the diameter of the wear scar following POD testing.
4. The area of the wear scar was calculated.
5. TriboX software (CSM Instruments Peseux, Switzerland) was used to calculate wear rate of the vinyl ester films.

The characteristics of each sample are indicated in Table 7 below. Table 8 illustrates the raw data collected for friction coefficient measurements. Table 9 illustrates the raw data collected for wear rate measurements. Table 10 illustrates the average friction coefficient and wear rate for each sample.

TABLE 7

Alumina concentration

| | Flock | % Alumina in Flock |
|---|---|---|
| Sample 1 | 1/64" | 0% |
| Sample 2 | 1/64" | 1% |
| Sample 3 | 1/64" | 0.10% |

TABLE 8

Raw data measured for wear rate.

| Load [N] | Sliding Velocity [cm/sec] | Sample 1 Side A | Sample 1 Side B | Sample 2 Side A | Sample 2 Side B | Sample 3 Side A | Sample 3 Side B |
|---|---|---|---|---|---|---|---|
| 2 | 5 | 3.81E−05 | 2.26E−05 | 1.61E−05 | 1.29E−05 | 2.98E−05 | 1.27E−05 |
| | 7 | 3.50E−05 | 4.41E−05 | 3.27E−05 | 1.73E−05 | 3.09E−05 | 1.12E−05 |
| | 10 | 4.46E−05 | 2.65E−05 | 2.37E−05 | 1.90E−05 | 2.50E−05 | 1.37E−05 |
| 5 | 5 | 4.22E−05 | 3.64E−05 | 4.32E−05 | 5.42E−05 | 8.51E−05 | 1.65E−05 |
| | 7 | 5.71E−05 | 4.39E−05 | 5.37E−05 | 5.46E−05 | 6.54E−05 | 2.33E−05 |
| | 10 | 5.04E−05 | 3.94E−05 | 4.95E−05 | 4.86E−05 | 5.32E−05 | 2.12E−05 |
| 10 | 5 | 4.90E−05 | 3.09E−05 | 2.93E−05 | 3.14E−05 | 4.83E−05 | 1.90E−05 |
| | 7 | 5.52E−05 | 2.66E−05 | 3.11E−05 | 3.27E−05 | 6.60E−05 | 2.96E−05 |
| | 10 | 4.59E−05 | 3.97E−05 | 3.01E−05 | 2.96E−05 | 5.49E−05 | 2.66E−05 |
| | Average | 4.64E−05 | 3.45E−05 | 3.44E−05 | 3.34E−05 | 5.10E−05 | 1.93E−05 |

TABLE 9

Raw data measured for friction coefficient.

| Load [N] | Sliding velocity [cm/sec] | Sample 1 Side A | Sample 1 Side B | Sample 2 Side A | Sample 2 Side B | Sample 3 Side A | Sample 3 Side B |
|---|---|---|---|---|---|---|---|
| 2 | 5 | 0.085 | 0.081 | 0.086 | 0.077 | 0.390 | 0.062 |
| | 7 | 0.088 | 0.080 | 0.134 | 0.073 | 0.407 | 0.085 |
| | 10 | 0.117 | 0.072 | 0.105 | 0.081 | 0.379 | 0.074 |
| 5 | 5 | 0.120 | 0.079 | 0.083 | 0.064 | 0.207 | 0.072 |
| | 7 | 0.098 | 0.058 | 0.086 | 0.067 | 0.295 | 0.057 |
| | 10 | 0.081 | 0.070 | 0.092 | 0.074 | 0.294 | 0.075 |
| 10 | 5 | 0.087 | 0.082 | 0.092 | 0.065 | 0.174 | 0.071 |
| | 7 | 0.077 | 0.077 | 0.108 | 0.047 | 0.126 | 0.073 |
| | 10 | 0.088 | 0.079 | 0.095 | 0.074 | 0.118 | 0.067 |
| | Average | 0.093 | 0.075 | 0.098 | 0.069 | 0.266 | 0.071 |

TABLE 10

Average friction coefficients and wear rates

| | Alumina | | | | | |
|---|---|---|---|---|---|---|
| | 0% | | 1.0% | | 0.1% | |
| Texture | Rough | Smooth | Rough | Smooth | Rough | Smooth |
| Friction Coef. | 0.093 | 0.075 | 0.098 | 0.069 | 0.266 | 0.071 |
| Wear Rate | 4.64E−05 | 3.45E−05 | 3.44E−05 | 3.34E−05 | 5.1E−05 | 1.93E−05 |

Side A = Rough
Side B = Smooth

Figure 1B:
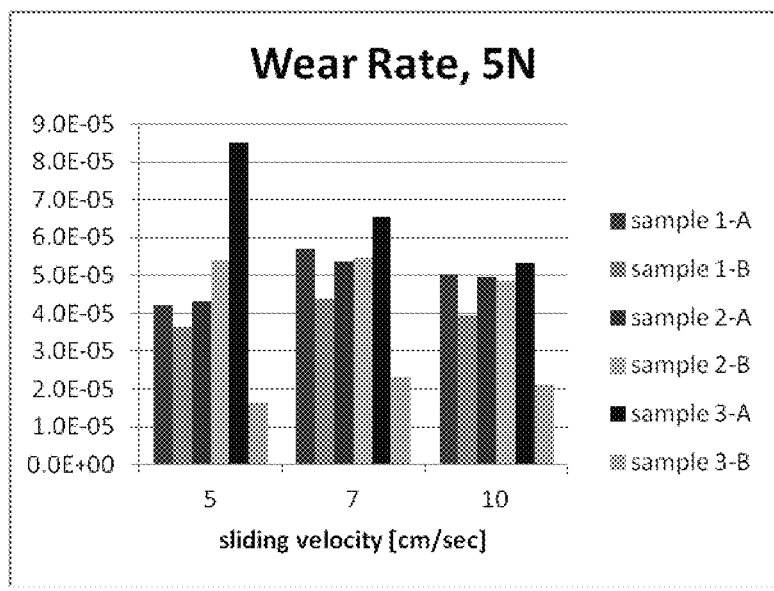
FIG. 1B is a graphical illustration of the calculated wear rates of three vinyl ester film samples with varying concentrations of $Al_2O_3$ and a pin load of 5N.
Figure 1C:
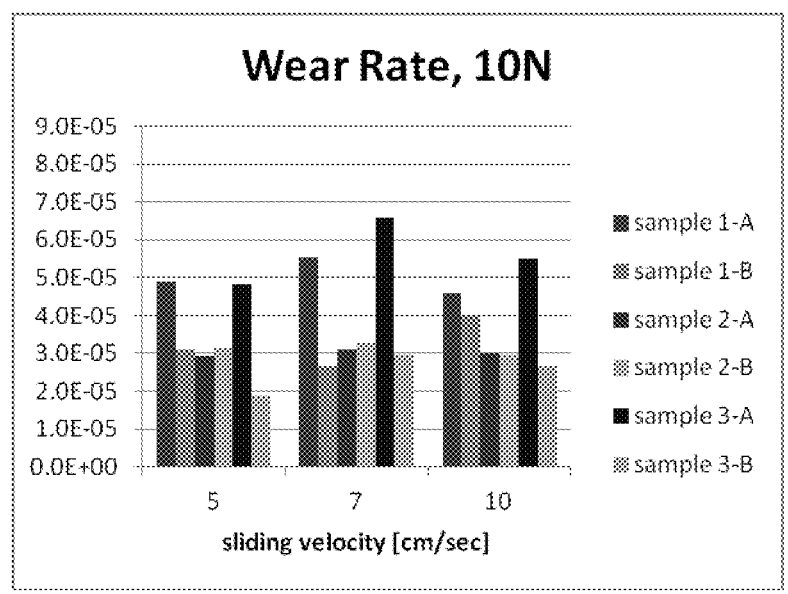
FIG. 1C is a graphical illustration of the calculated wear rates of three vinyl ester film samples with varying concentrations of $Al_2O_3$ and a pin load of 10N.
Figure 2A:
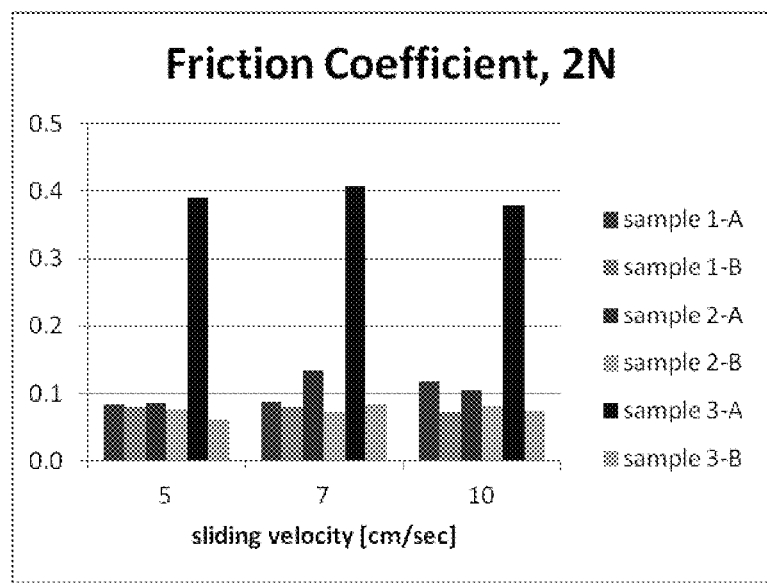
FIG. 2A is a graphical illustration of the calculated friction coefficient of the three vinyl ester film samples with varying concentrations of $Al_2O_3$ and a pin load of 2N.
Figure 2B:
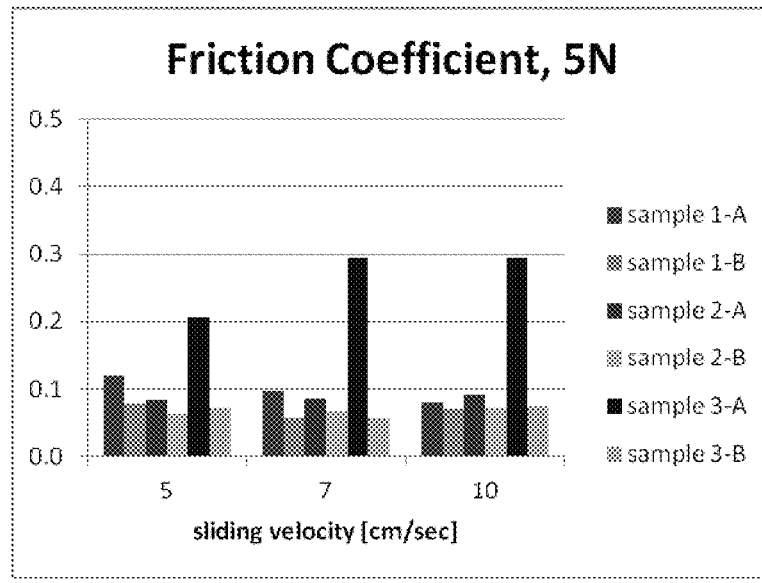
FIG. 2B is a graphical illustration of the calculated friction coefficient of the three vinyl ester film samples with varying concentrations of $Al_2O_3$ and a pin load of 5N.
Figure 2C:
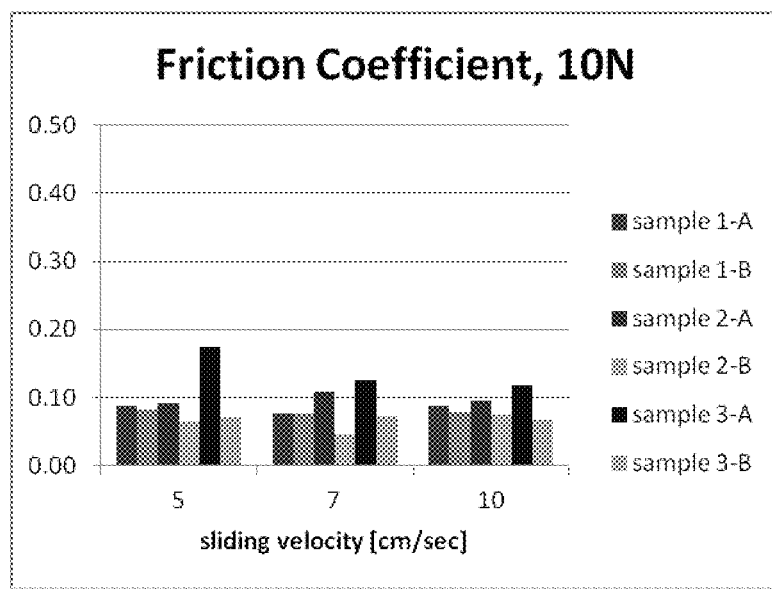
FIG. 2C is a graphical illustration of the calculated friction coefficient of the three vinyl ester film samples with varying concentrations of $Al_2O_3$ and a pin load of 10N.

FIGS. 1A, 1B and 1C are graphical illustrations of the data included in Table 8 and summarized in Table 10. This data illustrates the calculated wear rates of three vinyl ester film samples as described by the present disclosure with varying concentrations of $Al_2O_3$ (0%, 0.1% and 1.0%). The film samples contain a rough side (side A) and a smooth side (side B), each of which was tested for wear rate. Each sample was tested with a pin load of 2N (FIG. 1A), 5N (FIG. 1B) and 10N (FIG. 1C). FIGS. 2A, 2B and 2C are graphical illustrations of the data included in Table 9 and summarized in Table 10. This data illustrates the calculated friction coefficient of the three vinyl ester film samples described above in FIGS. 1A-1C. Similar to FIGS. 1A-1C, both sides of each sample were tested with a pin load of 2N (FIG. 2A), 5N (FIG. 2B) and 10N (FIG. 2C).

In the majority of tested samples, the "B-side" (smooth side) yielded the slowest wear rates (measured as a function of variable sliding velocity and loading conditions) as well as the lowest friction coefficients. As illustrated by FIGS. 1A-1C, the vinyl ester films with a 0.1% concentration of $Al_2O_3$ had the lowest wear rates. The samples with an $Al_2O_3$ concentration of 0.1% and 1.0% have frictional coefficients lower than samples containing no $Al_2O_3$ (FIGS. 2A-2C). These experiments demonstrate that vinyl ester film plates with a $Al_2O_3$ concentration of 0.1% have the optimal combination of low wear rate and low friction coefficient.

Inclusion of the $Al_2O_3$ in the fiber matrix in molded PTFE parts, such as bearings, improves wear resistance. As described in the present disclosure, $Al_2O_3$ also improves wear when utilized in a matrix spun PTFE fiber. This fiber also shows increased cut resistance in materials constructed from filament yarns of this fabric as well as improving thermal conductive properties. These properties will allow improved wear characteristics of composite bearings made from PTFE fibers as well as other applications where cut resistance (i.e., gloves) and thermal conductivity improvements (i.e., laminated cooking belts) are needed.

As will be apparent to one skilled in the art, various modifications can be made within the scope of the aforesaid description. Such modifications being within the ability of one skilled in the art form a part of the present invention and are embraced by the claims below.

It is claimed:

1. A process of making a fluoropolymer fiber containing aluminum oxide comprising, forming a mixture of an aqueous dispersion of non-melt-processible polytetrafluoroethylene particles and aluminum oxide particles with an aqueous solution of a matrix polymer, extruding the mixture into a coagulation bath and forming an intermediate fiber structure by coagulating the matrix polymer in the coagulation bath, and sintering the intermediate fiber structure to decompose the matrix polymer and coalesce the polytetrafluoroethylene particles and the aluminum oxide particles into a blended fiber.

2. The process according to claim 1 wherein the concentration of aluminum oxide particles in the mixture is about 0.1% to 5%.

3. The process according to claim 1 further comprising providing perfluoroalkoxy polymer in the mixture.

* * * * *